June 19, 1934.    W. RITTMEISTER    1,963,717
METHOD FOR THE HEAT TREATMENT UNDER PRESSURE OF HIGH BOILING HYDROCARBONS
Filed April 27, 1932
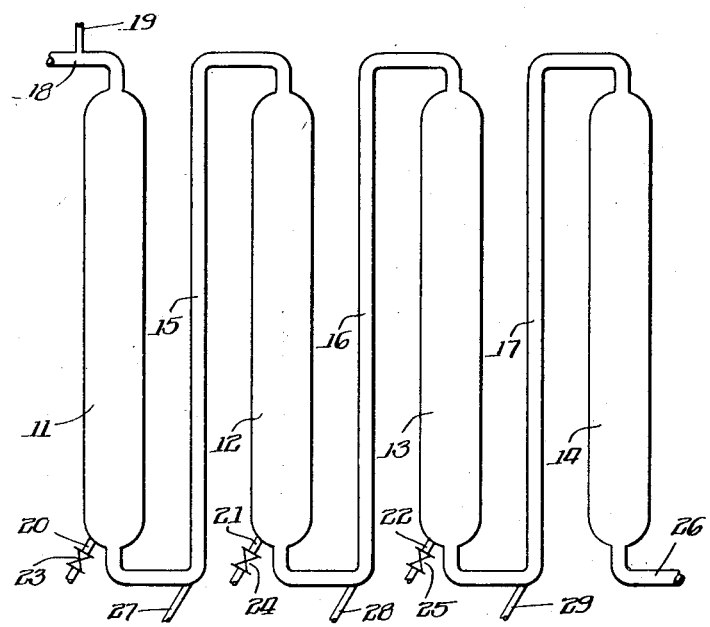
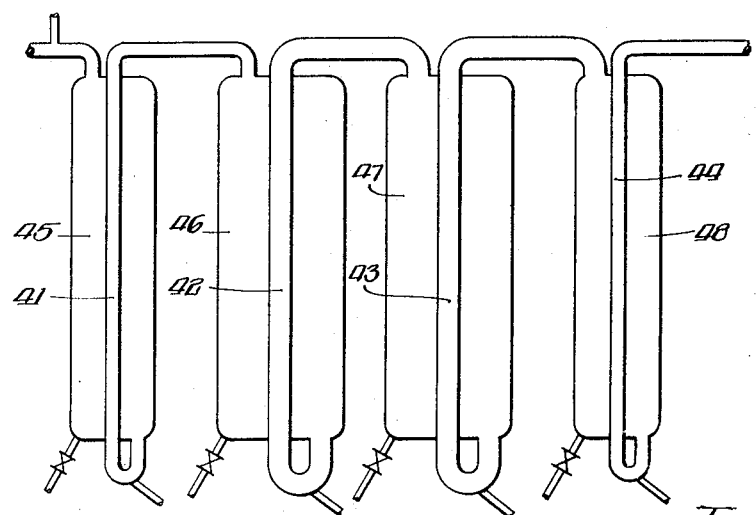
Inventor:
Wilhelm Rittmeister;

Patented June 19, 1934

1,963,717

UNITED STATES PATENT OFFICE 1,963,717

METHOD FOR THE HEAT TREATMENT UNDER PRESSURE OF HIGH BOILING HYDROCARBONS

Wilhelm Rittmeister, Rodleben, near Rosslau, Germany

Application April 27, 1932, Serial No. 607,736
In Germany May 6, 1931

6 Claims. (Cl. 196—53)

This invention relates to improvements, methods and apparatus for the heat treatment under pressure of high boiling hydrocarbons, and more particularly to the hydrogenation of these hydrocarbons. Such materials include bituminous materials, mineral oils, their distillation and extraction products and residues or those obtained from coals, lignites and similar materials. In treatment of these materials under high pressures and temperatures considerable operating difficulty is experienced due to the formation and separation of coke. This is particularly true in cracking processes or in the Bergius process in which hydrogen or hydrogen-containing gases are employed at high temperatures and pressures. The operation of such processes becomes difficult and sometimes impossible if coke accumulates in the reaction equipment. Such coke accumulation causes local overheating of the equipment, plugging of the pipes and tubes, frequent shutdowns and becomes a source of danger while operating.

It is an object of the present invention to provide an improved apparatus for the high temperature, high pressure hydrogenation of hydrocarbonaceous materials.

It is a further object of this invention to provide an improved apparatus of such design that the accumulation of coke will be avoided in the high temperature high pressure hydrogenation of such materials.

It is an additional object to provide a new and improved method of treating materials of the character described whereby the deposition of solid carbon will be prevented.

It is also an object to provide a method in which the materials and reagents will be repeatedly mixed during the process whereby a thorough and continued contact between them will be assured.

Other and further objects will appear as the description proceeds.

I have shown certain preferred embodiments of my invention somewhat diagrammatically in the accompanying drawing, in which—

Figure 1 is a vertical section of one form of apparatus and

Figure 2 is a similar view of a modified form of apparatus.

Referring first to the form of construction shown in Figure 1, the apparatus comprises relatively wide cylindrical reaction vessels 11, 12, 13 and 14, and the relatively narrow tubular reaction vessels 15, 16 and 17, which are connected between the cylindrical vessels. The upper end of vessel 11 is provided with the pipe 18 through which material to be treated is introduced, this pipe having a branch pipe 19 for the introduction of hydrogen containing gas. The lower ends of the vessels 11, 12 and 13 are each provided with the pipes 20, 21 and 22 respectively, these pipes being for the purpose of withdrawing material for the apparatus. These pipes 20, 21 and 22 are controlled by the valves 23, 24 and 25 respectively. The discharge passage 26 leads from the last vessel 14. The lower ends of the three tubular vessels 15, 16 and 17 are provided with inlet pipes 27, 28 and 29 respectively, these pipes being adapted for the introduction of additional hydrogen containing gas.

The form of construction shown in Figure 2 is generally similar to that shown in Figure 1. The smaller tubular reaction vessels 41, 42, 43 and 44 are arranged, however, to pass upwardly through the larger cylindrical vessels 45, 46, 47 and 48. This results in heat exchange between the vessels and also the pressure in the larger vessels surrounds the smaller vessels. The sizes of the vessels are shown as different, the cylindrical vessels 46 and 47 being larger than the vessels 45 and 48 and the tubular vessels 42 and 43 being larger than the vessels 41 and 44. This results in lower velocity in the intermediate portion of the flow of material. The pipes for introducing gas and material and for withdrawing material in Figure 2 are similar to those shown in Figure 1.

By the use of the above apparatus, hydrocarbons of all types, including those which form coke very easily, can be converted into low boiling materials suitable for use as motor fuels or higher boiling materials suitable for use as lubricants without coke formation if the operation is continuous and takes place in the presence of hydrogen or hydrogen containing gases in vertical tubular reaction vessels. The reaction vessels are connected in such a way that the products being treated flow downward through a vessel of relatively large diameter and upward through a tubular vessel of relatively small diameter. Thus in this operation the reacting materials enter at the top of the large vessel and are withdrawn at the bottom and rise through the tubular vessel. The velocity of the materials in the tubular vessel is high in comparison with that obtaining in the large vessel. In the operation the materials which are liquid under the conditions of the reaction and which tend to polymerize to form coke fall rapidly to the bottom of the large reaction vessel from which point they are removed by the gaseous and vaporous reaction products and pass upward through the tubular vessel at a relatively high velocity. In this way the materials which would tend to form coke are prevented from settling out during the treatment or from accumulating in any part of the equipment, and pass rapidly through the reaction system while the gaseous and vaporized materials have ample time to be converted into low boiling hydrocarbons. A further advantage resulting from the use of this equipment results from the intimate mixing obtained between the materials being treated and the hydrogen containing gas at the point of withdrawal from the large reaction vessel and through the tubular vessel.

It is also advisable in some cases to use known agents for the prevention of coke formation in this operation. Such agents may include anthracene oil or hydrogenated tar or, in some low temperature operations, naphthalene oil. These materials serve as solvents for highly asphaltic materials and prevent them from settling out. The efficiency of the process may also be improved by the use of catalysts or of contact masses which may be fixed in the vessels of wide diameter.

In the construction of this apparatus it is desirable to make the volume of the large vessels sufficient to insure the formation of high yields of low boiling materials when operating at low temperatures. The diameter of the tubular vessels may vary in a limited range. The ratio of the diameters of the large and the tubular vessels must be such as to insure a much higher velocity in the tubular vessel than that which obtains in the larger vessel. The ratio of the diameter of the larger vessel to that of the tubular vessel may be in the order of ten to one, but this may vary depending on the throughput desired in the equipment.

The reaction units may be arranged in a series of alternating large and tubular vessels as shown in Figure 1. It is possible to vary the diameters of the various vessels in the series both in the large and in the tubular vessels, as shown in Figure 2. In this manner it is possible to vary the velocity of the materials in the various stages of the reaction and maintain a high flow rate where there is a tendency for coke forming materials to deposit.

It is also possible to maintain different temperatures in different reaction vessels and in some units of the series it may be desirable to maintain a temperature in the tubular reaction vessel through which the oil flows upward at such a point that substantially no reaction takes place while in the wide vessels by virtue of catalytic masses of the desired type of catalytic activity virtually all the reactions take place. By controlling the temperature in another manner it will be possible to obtain the greater part of the cracking desired in the tubular vessels and obtain the hydrogenation in the wide vessel.

The drawing is diagrammatic and these reaction vessels may be arranged in any suitable way and may be arranged in stellar form or otherwise or the narrow reaction vessel may be contained within the larger vessel as shown in Figure 2.

In the operation of the apparatus the material to be treated enters at point 18 after having been raised to a suitable temperature and pressure. At this point it may or may not be admixed with a hydrogen containing gas. A suitable quantity of hydrogen containing gas may be introduced through pipe 19 and the mixture of the material to be treated and the gas pass to the first hydrogenation vessel 11. This is a relatively wide vessel and the liquids in the charging material quickly fall to the bottom and are swept out of vessel 11 into the tubular reaction vessel 15. Additional hydrogen containing gas may be introduced through pipe 27. The materials rise rapidly through the tubular vessel 15 and enter the second vessel 12 of relatively wide diameter. Again the liquid materials are swept out of the vessel, pass through the tubular vessel 16 to wide vessel 13 and so on through 17 and 14 and discharge through pipe 26. Hydrogen containing gas may be introduced through pipe 28 and/or 29 depending on the type of reaction desired. When desirable it is possible to withdraw liquid materials from any or all points 20, 21 and 22.

The mixture of gas, vapors and liquid products leaving through pipe 26 are reduced in pressure after suitable cooling, the gas recovered and the liquids separated into the desired products by fractional distillation. The gas may be treated for purification and hydrogen enrichment in any suitable manner and recycled to the hydrogenation reaction. Heavy materials recovered from the distillation may be recycled to the reaction vessels in admixture with the untreated materials.

The apparatus may be modified where catalysts are used by the addition of means for retaining and/or supporting catalytic materials in the wider reaction vessels. Further, these wider vessels may be provided with baffles or with suitable spray headers at the top. This will be particularly desirable where these vessels are of relatively large diameters in order to break up the liquid material falling through the reaction vessel.

As an example of the effectiveness of this type of apparatus may be given the following test run.

High sulphur west Texas gas oil was treated in equipment as described containing four relatively wide reaction tubes through which the oil flowed downward and four relatively narrow tubes through which the oil flowed upward connected in series and alternating from the wide to the narrow tubes. The reaction took place under 200 atm. of hydrogen pressure and at a temperature of 460° C. After running for 150 hours the operation was stopped and the equipment opened. No coke was found. The gas oil had a gravity of 0.857 and the following boiling range:

|  | Per cent |
|---|---|
| To 230° C | 2 |
| 250° C | 9 |
| 300° C | 51 |
| 330° C | 71.5 |
| 360° C | 85.0 |

The oil obtained by the treatment had a gravity of 0.820 and the following boiling range:

|  | Per cent |
|---|---|
| To 200° C | 42 |
| 250° C | 60 |
| 330° C | 92 |

In another apparatus consisting of horizontal tubes, the same oil when treated under similar conditions gave lower yields and after 50 to 70 hours the equipment was so filled with coke that the operation had to be discontinued.

It will be understood that the showing of the drawing is diagrammatic in character and that the apparatus is capable of change and modification to meet varying conditions and requirements. It will also be apparent that the process

I claim:

1. The method of hydrogenating high boiling hydrocarbons, which comprises treating them under high temperatures and pressures in contact with hydrogen containing gases in a series of connected chambers alternately larger and smaller in cross sectional area, the flow being downward through the larger chambers and upward through the smaller chambers, the volume of the larger chambers being sufficient to permit reaction time for the material therein, and the cross sectional areas of the smaller chambers being such that the gases and hydrocarbons pass together without substantial delay from the bottom of one large chamber through the adjacent small chamber to the top of the succeeding large chamber to avoid the deposition of coke.

2. The method of hydrogenating high boiling hydrocarbons, which comprises treating them at temperatures of approximately 460° C. and under pressures of approximately 200 atmospheres in contact with hydrogen containing gases in a series of connected chambers alternately larger and smaller in cross sectional area, the flow being downward through the larger chambers and upward through the smaller chambers, the volume of the larger chambers being sufficient to permit reaction time for the material therein, and the cross sectional areas of the smaller chambers being such that the gases and hydrocarbons pass together without substantial delay from the bottom of one large chamber through the adjacent small chamber to the top of the succeeding large chamber to avoid the deposition of coke.

3. The method of hydrogenating high boiling hydrocarbons, which comprises treating them under high temperatures and pressures in contact with hydrogen containing gases in a series of connecting chambers alternately larger and smaller in cross sectional area, the larger chambers containing catalytic materials, the flow being downward through the larger chambers and upward through the smaller chambers, the volume of the larger chambers being sufficient to permit reaction time for the material therein, and the cross sectional areas of the smaller chambers being such that the gases and hydrocarbons pass together without substantial delay from the bottom of one large chamber through the adjacent small chamber to the top of the succeeding large chamber to avoid the deposition of coke.

4. The method of hydrogenating high boiling hydrocarbons, which comprises treating them at temperatures of approximately 460° C. and under pressures of approximately 200 atmospheres in contact with hydrogen containing gases in a series of connected chambers alternately larger and smaller in cross sectional area, the larger chambers containing catalytic materials, the flow being downward through the larger chambers and upward through the smaller chambers, the volume of the larger chambers being sufficient to permit reaction time for the material therein, and the cross sectional areas of the smaller chambers being such that the gases and hydrocarbons pass together without substantial delay from the bottom of one large chamber through the adjacent small chamber to the top of the succeeding large chamber to avoid the deposition of coke.

5. The method of hydrogenating high boiling hydrocarbons, which comprises treating them under high temperatures and pressures in contact with hydrogen containing gases in a series of connected chambers alternately larger and smaller in cross sectional area, the flow being downward through the larger chambers and upward through the smaller chambers, the volume of the larger chambers being sufficient to permit reaction time for the material therein, and the cross sectional areas of the smaller chambers being such that the gases and hydrocarbons pass together without substantial delay from the bottom of one large chamber through the adjacent small chamber to the top of the succeeding larger chamber to avoid the deposition of coke, and adding hydrogen containing gases at the bottom of the smaller chambers.

6. The method of hydrogenating high boiling hydrocarbons, which comprises treating them at temperatures of approximately 460° C. and under pressures of approximately 200 atmospheres in contact with hydrogen containing gases in a series of connected chambers alternately larger and smaller in cross sectional area, the flow being downward through the larger chambers and upward through the smaller chambers, the volume of the larger chambers being sufficient to permit reaction time for the material therein, and the cross sectional areas of the smaller chambers being such that the gases and hydrocarbons pass together without substantial delay from the bottom of one large chamber through the adjacent small chamber to the top of the succeeding large chamber to avoid the deposition of coke, and adding hydrogen containing gases at the bottom of the smaller chambers.

WILH. RITTMEISTER.